United States Patent
Kim et al.

(10) Patent No.: US 7,093,346 B2
(45) Date of Patent: Aug. 22, 2006

(54) CONNING MOTOR HUB SURFACE METHOD FOR HARD DISK DRIVES

(75) Inventors: Woo-Sung Kim, Cupertino, CA (US);
Sung-Wook Kim, San Jose, CA (US);
Eui-Sup Ka, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/145,908

(22) Filed: Jun. 3, 2005

(65) Prior Publication Data

US 2005/0223544 A1    Oct. 13, 2005

Related U.S. Application Data

(62) Division of application No. 10/657,351, filed on Sep. 8, 2003.

(51) Int. Cl.
*G11B 5/127* (2006.01)
*G11B 5/187* (2006.01)

(52) U.S. Cl. .............. 29/603.03; 29/603.04; 29/901; 360/99.05; 360/99.12

(58) Field of Classification Search ............ 29/603.03, 29/603.04, 603.05, 603.06, 603.07; 360/99.12, 360/199.05, 99.05; 336/206, 209
See application file for complete search history.

(56) References Cited

U.S. PATENT DOCUMENTS

| | | | |
|---|---|---|---|
| 5,283,491 A * | 2/1994 | Jabbar et al. ................. 310/90 |
| 5,838,516 A | 11/1998 | Staggers et al. |
| 6,148,501 A * | 11/2000 | Grantz et al. ............ 29/603.03 |
| 6,567,238 B1 * | 5/2003 | Renken et al. ........... 360/99.12 |
| 6,785,090 B1 | 8/2004 | Koyanagi et al. |
| 2001/0013989 A1 * | 8/2001 | Saiki et al. ............... 360/78.04 |
| 2002/0057530 A1 * | 5/2002 | Lalouette .................... 360/135 |

* cited by examiner

*Primary Examiner*—David P. Bryant
*Assistant Examiner*—Sarang Afzali
(74) *Attorney, Agent, or Firm*—GSS Law Group

(57) ABSTRACT

A hard disk hub has a disk-mounting face formed at one end as a truncated conical surface of revolution symmetric about the hub axis. A cylindrical inner hub member is coaxial with the hub body outside diameter and the surrounding mounting face. The inner hub member is adapted to receive a planar disk with a central mounting hole with disk inside diameter fitted around it. The mounting face is disposed at a hub conning angle ($\pi/2 +/- \Omega$) relative to the hub axis. Hub conning angle $\Omega$ is selected so that a disk mounting force F applied to an inner disk portion surrounding the central mounting opening bends a portion of the disk interior to the hub inside diameter to conform contiguous facing relationship with the conical disk-mounting face. This interior bending portion reduces or eliminates the tendency of the outer disk portion to form an excessive conning angle $\theta$.

10 Claims, 3 Drawing Sheets

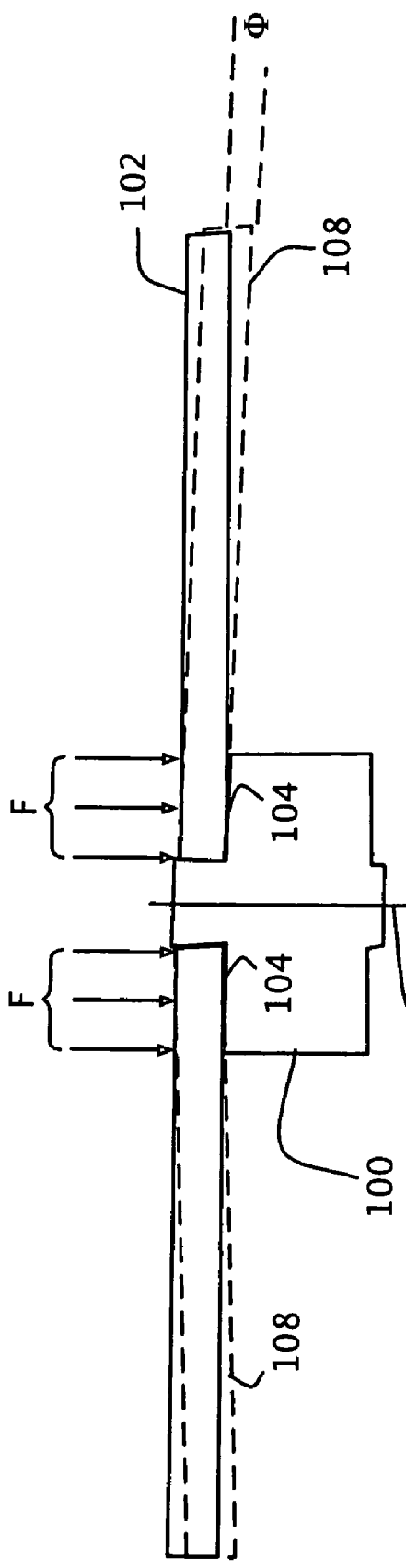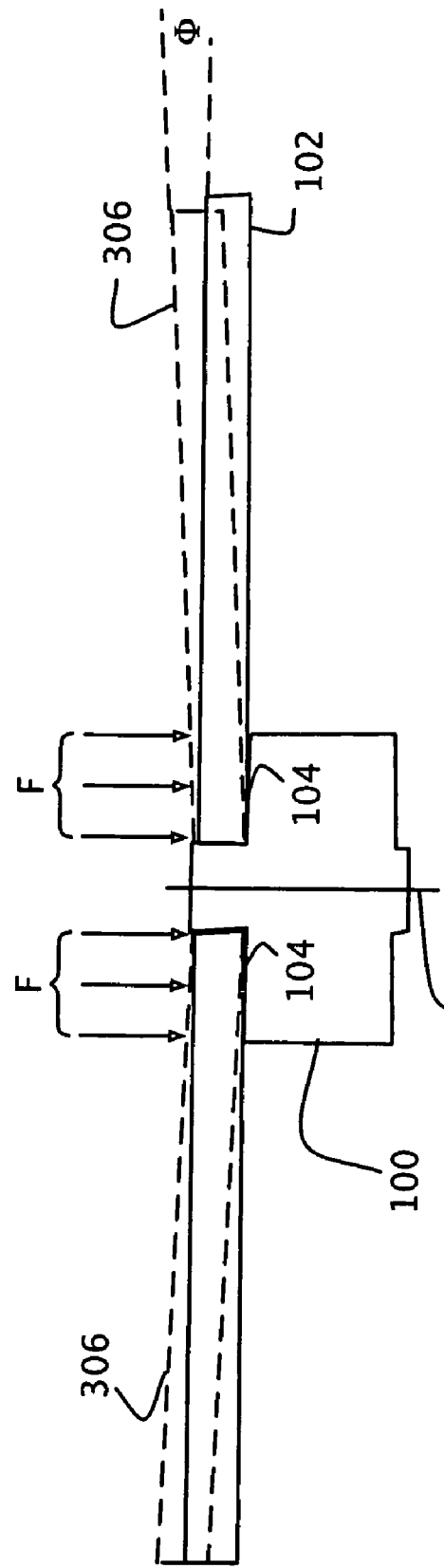

CONNING MOTOR HUB SURFACE METHOD FOR HARD DISK DRIVES

CROSS REFERENCE TO RELATED APPLICATIONS

This application is a divisional application of U.S. patent application Ser. No. 10/657,351, filed Sep. 8, 2003.

FIELD OF INVENTION

The present invention relates to a structure and method of mounting disks on a disk drive spindle to reduce disk conning distortion.

DESCRIPTION OF RELATED ART

One of the primary goals of ABS (air bearing surface) design on a head slider in hard disk drive applications is to maintain a constant flying height along the actuator stroke path between inward and outward data zones on a flat disk surface. The disks on a drive spindle are typically mounted between circular spacers, or rings that apply compressive force around the inner periphery of opposite sides of the central disk portion. The compression or clamping force is chosen to keep the disk from slipping under the severe operating and environment conditions, such as high start and stop torque, high rotation speed, thermal cycling, thermal expansion, and physical shock and vibration. The clamping force typically required to prevent disk slippage under such severe environments frequently cause mounted disks to deform from an initially flat plane into non-planar shapes that compromise performance.

Over it is known that even when disks are nominally flat (planar) when received from a disk manufacturer, variations in manufacturing processes produce disks that have variations in the radial morphology (shape) around the central interior. In the past, the specifications for disks did not address the issue of disk morphology in a way that would guarantee uniform and consistent planarity (flatness) behavior when mounted on a disk spindle. Some disk manufacturers supplied disks with excessive rounding (roll-off) or bumping (ski-jump) at the inner diameter of the disk that would result in unacceptable disk distortion when mounted and clamped onto a disk spindle. Disks with such initial radial morphology variations frequently exhibited undesirable performance variations that caused lower yields and higher costs for finished disk drives. These conditions persisted until performance and cost requirements reached levels that made them intolerable. Once the influence of disk clamping forces and disk morphology on disk distortion was understood, measurement techniques and disk specifications evolved to eliminate limitations caused by clamped disk distortion or at least to reduce the distortion and variation to a level that allowed acceptable performance and yield targets to be met.

However, as performance and cost pressures continue to increase even the previously acceptable levels of disk distortion are becoming problematic and in some cases have become unacceptable. Referring to FIG. 1 there is shown a prior art disk hub 100 and an initially flat, planar disk 102 with opposite plane, parallel faces. The disk hub 100 has an essentially flat, circular mounting face 104 disposed coaxial with spindle axis 106. A coaxial inner portion of the disk is mounted against a matching co-planar mounting face 104 of the hub. Although the disk and hub face may initially be perfectly flat when brought into contact, applying a significant clamping force distribution (indicated by arrows F) against the opposite side of the disk to hold the disk (or disks, in the case of a multiple-disk assembly), can cause the initially planar disk 102 to deform into a concave (downward facing) cone extending beyond the outer diameter of the hub body as shown by dashed lines 108. The deformed cone-shaped disk 108 has a conning angle $\Phi$ that depends on the magnitude and distribution of the force F and the inner and outer diameters of the hub face 104. For the purposes of this document, the term conning angle refers to the least angle of inclination between a radial along the surface of a cone and a plane perpendicular to the cone's axis of revolution.

FIG. 2 is a reproduction of FIG. 19 from a document titled *Model* 4224 *Disk Inspection Tool Equipment Capabilities* published by THôT Technologies, Inc. of Campbell, Calif. FIG. 2 shows the results of a measurement of radial and circumferential distortion for an initially flat disk mounted on a conventional flat surface hub face.

It is clear that the best-fit cone shows a substantial amount of distortion, i.e., an appreciable negative conning angle.

FIG. 3 illustrates the opposite effect of a positive conning angle $\Phi$ (concave upward) for a different clamping force distribution F, causing the disk 102 to deform into the upward concave conical shape 306.

These situations have been observed in practice over the years, but have more recently become problematic as disk performance requirements continue to increase.

It is known that static loss or gain of head flying height occurs due to such crown and camber effects and sensitivities in ABS drives. It is also known that the geometric disk conning angle can play a role as significant contributor to crown effect in high performance disk drives. This can result in a noticeable non-uniform radial flying height pattern for ABS drives nominally designated as "constant flying height ABS".

This loss or gain of flying height due to the crown effect can be modeled as directly proportional to geometric circumferential curvature. At a certain radial location of the disk, this curvature is simply proportional to the reciprocal of the radial location and proportional to the constant disk conning angle for a given disk surface. That is, Static Head Flying Height Gain is proportional to $\Theta/r$ where $\Theta$ is the disk conning angle, (positive on convex side, negative on concave side) and r is the radius of a location on a mounted disk.

Moreover, when using mirror ABS design for upward and downward facing heads on two opposed faces of a disk, the disk conning angle causes the gradient and the magnitude of the radial flying height change to be of opposite signs on opposite faces of the disk.

The signs are opposite, because one side of a cone is concave (sinking loss) whereas the other side is convex (floating gain). The opposite radial patterns induced from this difference in terms of both gradient and magnitude may cause significant difference in flying height for two up- and downward facing heads. This in turn can cause extreme difficulty in attempting data zone layout optimization for balanced performance among both the zones and two disk surfaces if the mirror ABS design is adopted. Practically, for instance, 0.08 degree of the conning angle may cause the above problems and 0.02 degree may be small enough to prevent the problematic zoning optimization.

It would be advantageous to provide means for reducing or eliminating conning angle distortion caused by disk clamping forces.

SUMMARY OF INVENTION

The invention discloses a structure and method for flexible control and adjustment of a desirable disk conning angle by controlling the shape of the spindle motor hub surface, on which one or more disks are mounted. In one embodiment of the present invention, a concave conning hub surface can be achieved by upward micro tapering. For instance, in an application with about 200 pound clamp force and aluminum disks with about 0.05-inch thickness and 3.5-inch diameter, the required typical range of the concave (upward) hub face angle is from about 0.01 to about 0.03 degree for less than about 0.02-degree convex (downward) disk conning angle.

In the same manner, excessive concave (upward) disk conning angle can be also controlled by designated convex (downward) motor hub face angles.

BRIEF DESCRIPTION OF THE DRAWINGS

A preferred embodiment of the present invention is further described in connection with the accompanying drawings, in which:

FIG. 1 is a cross-section elevation view of a prior art disk-mounting hub and mounted disk where clamping force causes a negative (downward) conning angle.

FIG. 3 is a cross-section elevation view of positive (upward) conning angle distortion caused by a different clamping force distribution in a prior art disk-mounting hub.

DETAILED DESCRIPTION OF THE INVENTION

The following description is provided to enable any person skilled in the art to make and use the invention and sets forth the best mode presently contemplated by the inventors of carrying out the invention. Various modifications, however, will remain readily apparent to those skilled in the art, as generic principles of the present invention have been defined herein.

Reference will now be made in detail to a presently preferred embodiment of the invention as illustrated in the accompanying drawings.

Figure 2:
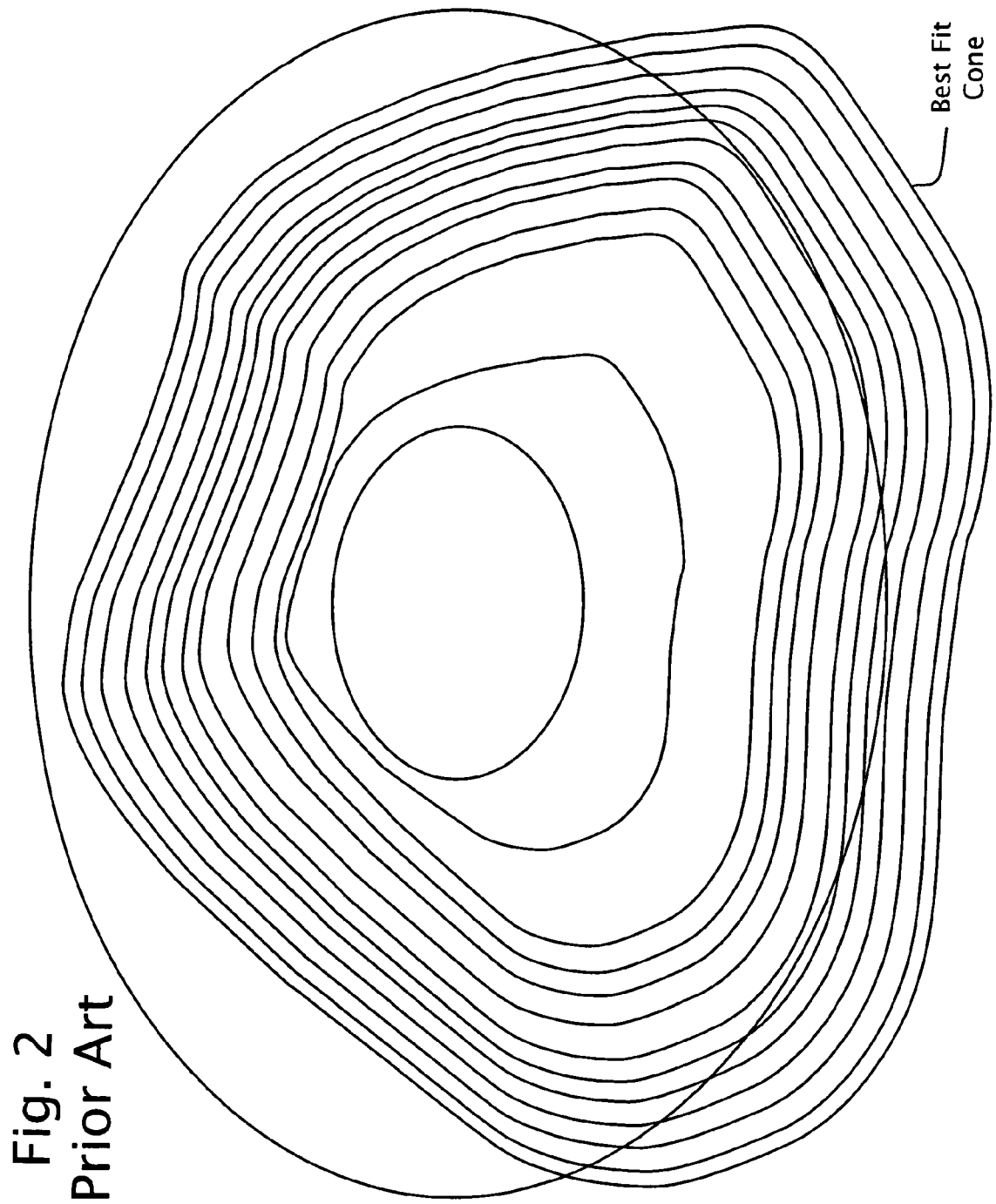
FIG. 2 is a display of measured disk conning distortion caused by clamping force in a prior art disk-mounting hub.
Figure 4:
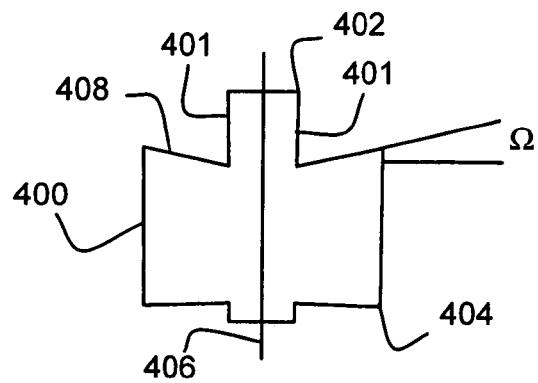
FIG. 4 shows a cross-section elevation view of a disk-mounting hub having a micro-tapered disk mounting face in accordance with the present invention.

In a preferred embodiment of the present invention, as best seen in FIG. 4, a disk mounting hub 400 has a cylindrical hub member 401 with inside diameter 402 extending from one end of the hub body. Disk mounting hub 400 forms a cylindrical outside diameter 404 coaxial with member inside diameter 402 along spindle axis 406. Between the inner member inside diameter 402 and the outer body outside diameter 404 there is defined a micro-tapered disk mounting face 408. Face 408 forms a transverse section of a concave (upward opening) conical figure of revolution symmetrical with hub axis 406. The hub disk mounting face 408 is disposed at hub face angle $\Omega$, referenced to a perpendicular to axis 406.

The mounting face 408 is precisely formed, for example, by micro-machining means known in the art, to a uniform conical surface of revolution about the axis 406 to define the hub face face angle $\Omega$. The disk mounting hub 400 may be made from a hub material, which may preferably be aluminum or steel.

Figure 5:
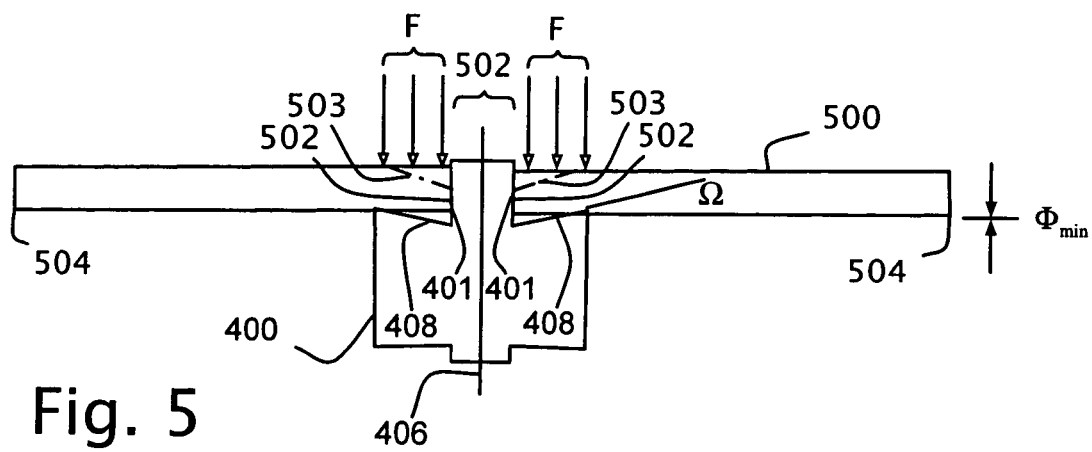
FIG. 5 illustrates a disk aligned and mounted on the hub of FIG. 4.

With regard to FIG. 5, disk mounting hub 400 is shown receiving a flat, two-sided planar disk 500. The two faces of the disk 500 define a central disk opening with coaxial inside diameter 502 and an outer disk periphery with coaxial disk outside diameter 504.

The disk 500 is disposed perpendicular to the axis 406 with a proximal surface facing the disk mounting hub 400 and oriented with disk inside diameter 502 aligned coaxial with and fitted around the cylindrical hub member 401 inside diameter 402.

An example disk clamping force distribution, as in FIG. 1, indicated by arrows F, is directed against the disk at its opposite, distal side over an inner portion 503 of the disk 500, toward the hub mounting face 408. Clamping force F is coupled from the proximal end of hub member 401 by a disk clamp adapter (not shown) fixed to the proximal end of disk inside diameter 502. Such disk clamp adapters are well known in the art.

For example, one known disk clamp adapter has the form of an inverted axially symmetric cup with a rigid central mounting base joined around its periphery to a depending coaxial rim through an axial-acting spring wall. The clamp base is fixed to the proximal end of the cylindrical hub member 401, for example, by screws, and adapted to press the cup rim against the outer face of the inner disk portion 503 with clamping force distribution F.

The hub face angle $\Omega$ for particular hub geometry and clamping force distribution F, is selected so that the bending of the inner disk ring-shaped portion (dashed lines 503) of disk 500 bends toward the face 408, following the slope of the hub face angle $\Omega$ between the hub outside diameter and inside diameter. The bending of the ring-shaped portion 503 toward the face 408 creates a circumferential bending moment acting on the outer disk portion (503–504) which opposes the tendency of the disk 500 to distort into a convex cone under the force distribution F (as in FIG. 1) but instead urges the outer disk portion extending from the hub outside diameter to disk outside diameter to remain exactly or nearly flat, i.e., perpendicular to the central axis 406 within an acceptable limit disk conning angle $\Phi_{min}$.

In one example of the present invention, for instance, in an application with about 200 pound clamp force F and aluminum disks with about 0.05-inch thickness and 3.5-inch outside diameter, the required typical range of the concave (upward) hub face angle $\Omega$ is from about 0.01 to about 0.03 degree for less than about 0.02-degree convex (downward) disk conning angle $\Phi$.

An experimental method to select the preferred hub face angle $\Omega$ for particular conditions, e.g., the above application condition is provided by measuring radial disk slope and differences in bit-error-rate (BER) for opposed heads on a hub-disk assembly as a function of clamping pressure with different hub face angles, and selecting from that data an optimal hub face angle for minimum disk conning angle distortion $\Phi_{min}$.

Figure 6:
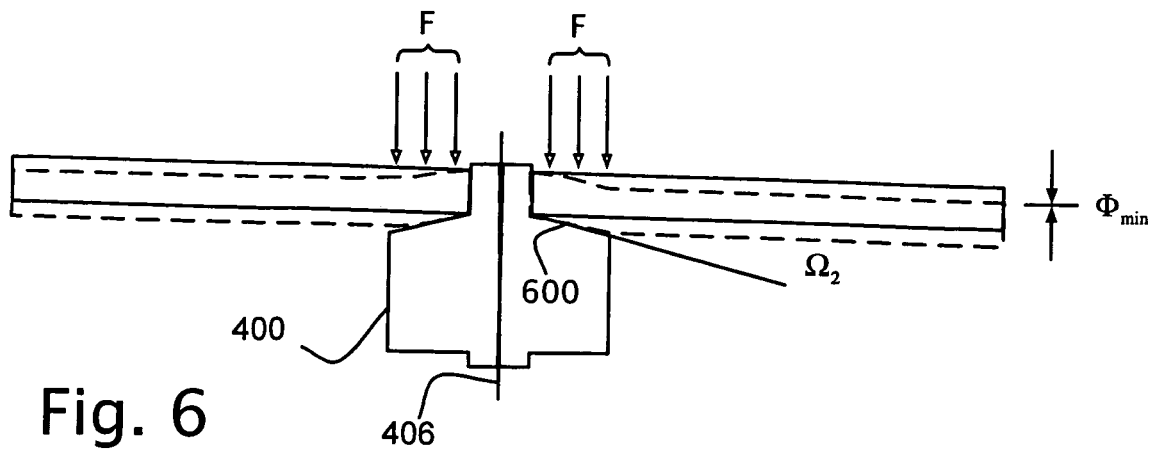
FIG. 6 depicts a disk aligned and mounted to an alternate micro-taped disk-mounting hub in accordance with the present invention.

FIG. 6 depicts an alternative embodiment of the present invention in which conventional flat hub mounting face geometry and clamping force F distribution as in FIG. 3 would normally cause an excessive positive disk conning angle $\Phi$. In this case hub face 600 is micro-tapered to a positive hub face angle $\Omega_2$ so that the disk conning angle is between zero and an acceptable limit disk conning angle $\Phi_{min}$.

The preferred embodiments described herein are illustrative only, and although the examples given include much specificity, they are intended as illustrative of only a few possible embodiments of the invention. Other embodiments and modifications will, no doubt, occur to those skilled in the art. The examples given should only be interpreted as illustrations of some of the preferred embodiments of the invention, and the full scope of the invention should be determined by the appended claims and their legal equivalent.

We claim:

1. A method for making a disk mounting hub for mounting a disk on an axial hard disk spindle in which said disk has opposite parallel faces between a disk outside diameter and a coaxial disk inside diameter defining a central opening there through, comprising:

forming a rigid cylindrical hub body having a hub outside diameter disposed along a central axis;

forming a cylindrical disk-mounting member disposed coaxial with said central axis at one end of said body and extending proximally with an inside diameter from said one end of said body, said inside diameter being sized to be received through said disk opening;

forming a coaxial hub face extending from said hub outside diameter to said member inside diameter adjacent to said one end of said hub as a truncated conical surface of revolution symmetrical about said axis, in which said conical surface is disposed at an oblique hub face angle $\Omega$ relative to said axis;

wherein said hub face angle $\Omega$ acts to minimize a disk conning angle $\Phi$ when said disk is clamped against said hub face.

2. The method of claim 1, further comprising:
selecting said hub face angle $\Omega$ so that:
with said disk mounted perpendicular to said hub axis and fitted with said disk inside diameter around said mounting member inside diameter with one disk face proximal and adjacent to said hub face;
and a predetermined clamping force F applied toward said hub face from said opposite disk face over an interior central portion of said opposite disk face;
then said interior central portion of said disk bends toward essentially conical contiguity with said truncated conical hub face surface at said oblique hub face angle $\Omega$ and away from parallel to the remaining exterior portion of said disk, while said remaining exterior portion of said disk remains disposed within an acute disk conning angle $\Phi$ limit relative to a perpendicular to said axis.

3. The method of claim 1, wherein said oblique hub face angle $\Omega$ is selected to form a hub face having a concave conical surface contour.

4. The method of claim 1, wherein said oblique hub face angle $\Omega$ is selected to form a hub face having a convex conical surface contour.

5. The method of claim 1, wherein said disk mounting hub is formed from a material selected from the group consisting of aluminum and steel.

6. The method of claim 1, further comprising:
providing a clamping member attached to said hub-mounting member for applying a clamping force F to one of said opposite disk faces.

7. The method of claim 1, further comprising:
providing a hub-mounting clamp member to include an axial-acting spring member between a disk contact end adapted to be in contact with said disk surface when said disk is clamped, and a rigid base end mounted to a hub mounting member at its extreme proximal end wherein said hub-mounting clamp member is arranged to exert a clamping force F on said disk surface toward said disk mounting hub.

8. The disk mounting hub formed by the process of claim 1.

9. A method for making a hard disk drive, comprising the steps of:
providing the disk mounting hub of claim 8;
coupling said disk mounting hub to a disk to create said hard disk drive.

10. The hard disk drive formed by the process of claim 9.

* * * * *